United States Patent [19]

Lowe

[11] Patent Number: 5,157,489
[45] Date of Patent: Oct. 20, 1992

[54] APPARATUS AND METHOD FOR REDUCING QUANTIZING DISTORTION

[76] Inventor: Virgil Lowe, 550 Woodman Pl., Roswell, Ga. 30076

[21] Appl. No.: 783,106

[22] Filed: Oct. 28, 1991

[51] Int. Cl.$^5$ .............................................. H04N 7/13
[52] U.S. Cl. ................................... 358/133; 358/135; 358/138; 358/160
[58] Field of Search ............... 358/133, 138, 443, 445, 358/457

[56] References Cited

U.S. PATENT DOCUMENTS

4,602,333  7/1986  Komori .............................. 358/138

Primary Examiner—Howard W. Britton

[57] ABSTRACT

This invention is a method and apparatus for passing quantized electronic signals of a given quantizing resolution through processing systems which have a quantizing accuracy less than that which the electronic signal is quantized to. The invention includes truncating the quantized signal to a given precision matching the precision of the processing system, and offsetting the truncated signal by a predetermined amount, normally 1 LSB, in a predetermined and predictable manner. The offsetting is preferred to occur in a regular pattern which is changed in response to the values of the bits which are discarded in the truncation.

17 Claims, 3 Drawing Sheets

FIGURE 4

FIGURE 5 ic signals in systems which do not pass the quantized signal with full quantizing accuracy. The invention will be found to be useful for previously quantized analog signals, either in digital form, such as digital pulse amplitude modulation which is commonly known, or in analog form. Analog forms include multilevel pulse amplitude modulation, where the analog signal is constrained to a given number of predetermined values. Such multilevel pulse amplitude modulation is used for example to transmit analog signals in the vertical and horizontal blanking interval areas of a video signal, wherein each given analog level corresponds to a particular binary pattern representation of the original analog signal. While the invention is described by way of example for use with video signals, one skilled in the art will recognize that it may also be used with other types of signals, such as audio or telemetry signals. In the description of the preferred embodiment provided herein, reference is made to timing signals such as horizontal sync, etc., which are somewhat restricted to video type signals, one skilled in the art will recognize that the descriptions herein referencing these intervals may be adapted to fit other timing signals, such as blocks of audio data, radar sweep periods, telemetry scan periods, etc.

The invention finds particular usefulness in applications where a video signal which has been previously digitized with 10 bit accuracy is passed through equipment having only 8 bit capability. The quantizing distortion introduced by the truncation of the lower two bits of resolution is reduced by offsetting the 8 bit truncated version by a small amount, preferably 1 LSB in a regular and predictable pattern, with the pattern being controlled in accordance with the value of the truncated bits. The invention which is particularly useful for digitized video signals and associated equipment will also find use for other types of quantized signals and with other levels of quantizing precision and truncation, so long as a clocking signal, related to the quantizing of the continuous analog version, or representing a continuous analog version, is available.

2. Description of the Prior Art

The prior art contains circuits for masking the quantizing distortion of video signals. Many of these circuits add random noise to the reduced precision signal, or use a variety of rounding schemes to achieve the reduction in distortion. One of these rounding schemes is described in the book D·I·G·I·T·L Television Edited by C. P. Sandbank, published by John Wiley & Sons, New York, N.Y. 10158. Pages 553 through 555 describe a method whereby a 12 bit digitized video signal is added to itself in an error feedback circuit to provide an 8 bit video signal. This method works well for the linear ramp signal shown in the book, however it is not nearly as effective on real video signals.

SUMMARY OF THE INVENTION

This invention is a method and apparatus for passing quantized electronic signals of a given quantizing resolution through processing systems which have a quantizing accuracy less than that which the electronic signal is quantized to. The invention includes truncating the quantized signal to a given precision matching the precision of the processing system, which truncation is effected by simply discarding the lower significance portions of the quantized signal to provide a truncated quantized signal, offsetting means to offset the truncated quantized signal by a predetermined amount, normally equal to the level of the lowest significance portion of the quantized signal, and a pattern means to control the offsetting means to perform said offset in a predetermined and predictable manner. In digital video versions of the invention, the pattern means generates one of $2_T$ offsetting patterns in response to the T truncated lower significant bits of the digitized video signal.

DESCRIPTION OF THE PREFERRED EMBODIMENT

In digital video systems which use quantized values that represent analog video levels, this invention will find considerable use. The CCIR-601 and CCIR-656 standard specifications, and the Society of Motion Picture and Television Engineers (SMPTE) recommendation RP125 specify an 8 bit standard. This standard is incorporated in the D1 standard in digital video recorders. An alternate specification is available for a 10 bit standard because 8 bits of quantizing causes visible degradation in the video signal. Present digital video recorders are capable of recording only the 8 bit standard. Typically, a 10 bit digitized signal is truncated to 8 bits for use by the 8 bit systems. The preferred invention embodiment includes a pattern means which will then generate 6 patterns which the offsetting means uses to add 1 LSB to the resultant 8 bit truncated video signal, thereby dithering the truncated video signal in a predetermined pattern.

Objects of the invention include:

Filling the signal in between the allowed quantizing steps so as to minimize the effects of quantizing errors, Dithering the reduced quantizing accuracy signal in a predetermined pattern which pattern changes according to the truncated information of the quantized signal, Filling in between the quantizing steps of a video signal so as to minimize the visible effects of the quantizing error to the human eye, Minimizing the quantizing error effects in a fashion that does not introduce further noise or artifacts in the analog signal, Allowing multiple passes of the quantized signal through the inventive process without introducing additional additive filling or dither, Allowing the truncated signal to be recovered to the original accuracy as much as possible, Providing an encoding means for dithering a quantized signal, which requires no further to processing when the quantized signal is converted back to a continuous analog signal.

These and other objects of the invention will become apparent to one skilled in the art from the description herein, taken in conjunction with the attached drawings.

SUMMARY DESCRIPTION OF THE ENCODING OPERATION

The encoding technique encodes the Least Significant Bits (LSBs) from a 10 bit signal into the 8 bit path by adding one bit in a pre-determined dithering scheme that is invisible to the eye. A one is added to the upper eight bits (the truncated version) 25% of the time when the two LSBs are Binary 01. One is added 50% of the time when the LSBs are Binary 10. And one is added 75% of the time when the LSBs are Binary 11. One skilled in the art will recognize that this concept is not restricted to video signals, but generally applicable to most quantized signals.

Figure 1:
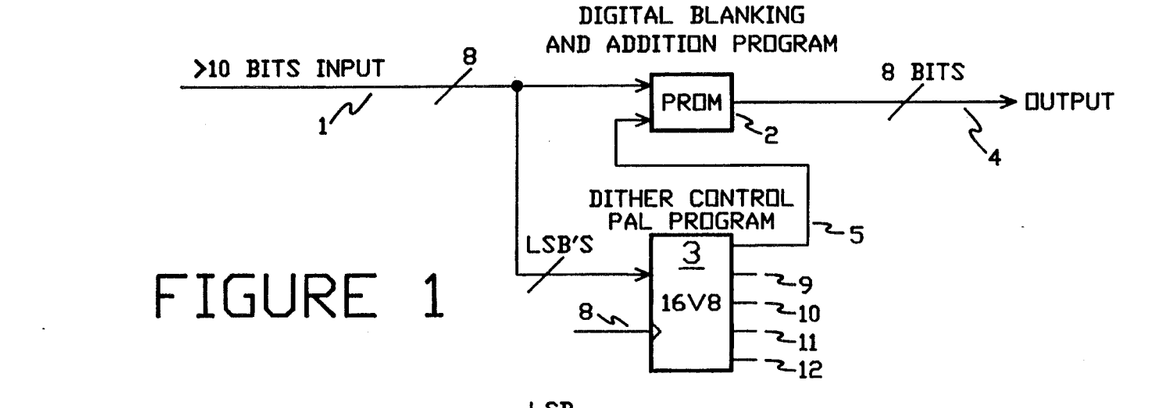
FIG. 1 is a block diagram of the encoder means of the invention.

FIG. 1 shows a block diagram of the preferred embodiment of the encoder having video input 1, PROM 2 which receives the truncated input video which has been truncated by discarding significance portions thereof, PAL 3 which receives quantizing clock 8 and generates divided clock signals 9, 10, 11, and 12, to produce dither rate signals which are internally used in the PAL, and which PAL 3 also receives the discarded significance portions of the signal 1 and which generates the dither signal 5 which is coupled to the PROM 2 to selectively cause the PROM to output a dithered truncated signal, which is achieved by the addition of a 1 LSB amount to the truncated video signal.

Figure 2:
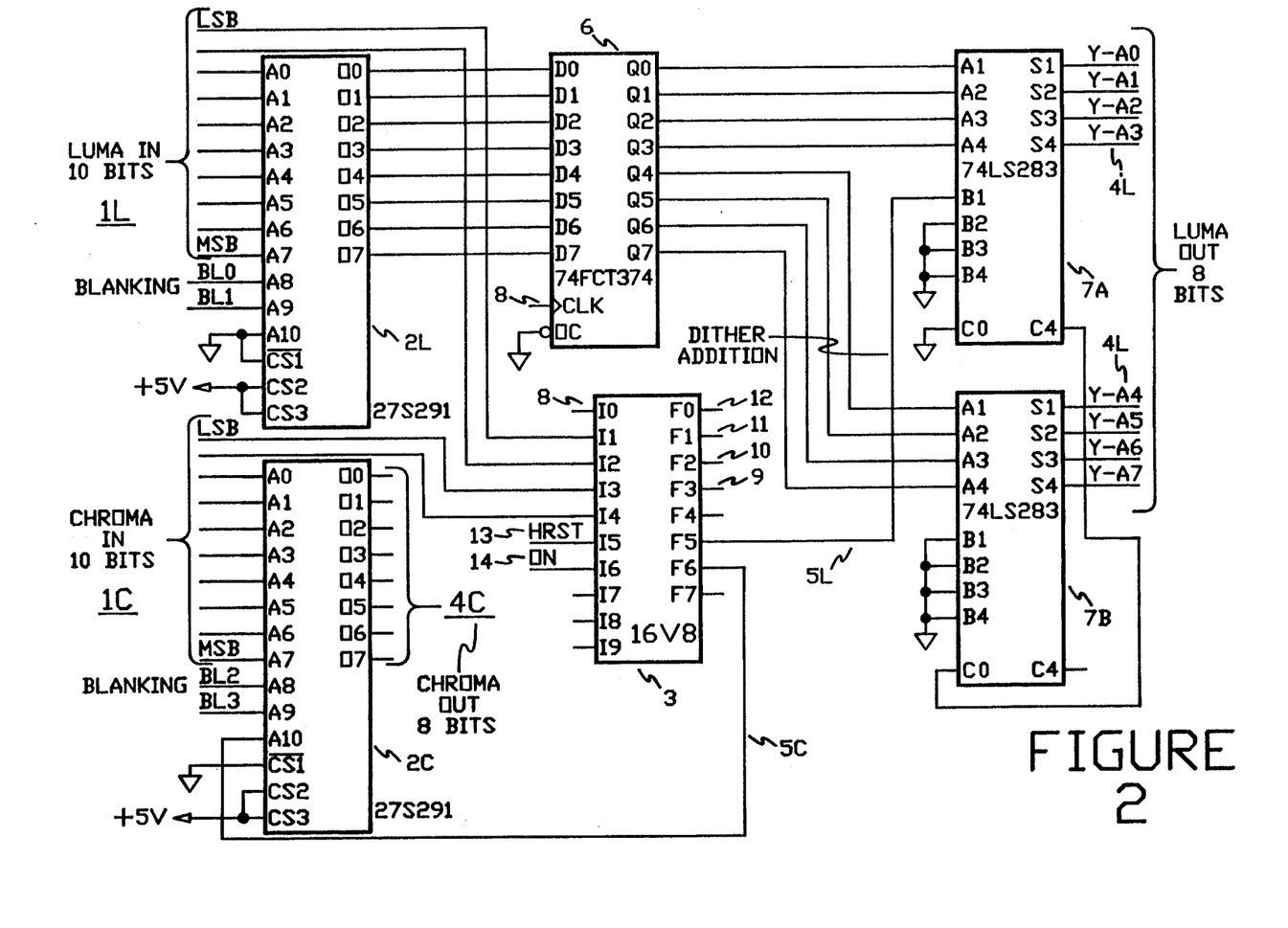
FIG. 2 is a schematic diagram of the encoder means of the invention.

FIG. 2 shows a schematic diagram of the invention, as used with digital video signals. In the preferred form, the digitized video has been separated into Luma (L) and chroma (C) components as is well known in the art. The schematic of FIG. 2 contains parallel paths for the L and C portions of the video signal.

Input luma 1L is coupled to PROM 2L which operates to blank the video signal at the proper time in response to blanking signals BL0 and BL1. When BL0 and BL1 are both low, the input is passed directly to the output. If BL0 is High and BL1 is Low, the output is one half the input. If BL0 is Low and BL1 is High, the output is one fourth the input. IF BL0 and BL1 are both High, the output is blanked to 0. This action allows the video to be blanked to 0 over a three clock or more period to provide some shaping of the video envelope. The blanked video out of the PROM is latched in latch 6, due to speed limitation of the PROM.

The Programmable Array Logic IC (PAL) 3 receives the two LSBs of the input 1L signal, as well as the sampling clock 8. The PAL divides the sampling clock by 2, 4, and 8 and provides these divided signals at 11, 9, and 12 respectively. In addition, a horizontal rate signal 13, is coupled to PAL 3 which divides this signal by two, making it available at 10. A control signal 14 is also coupled to 3 to turn the dithering on or off under operator control. The divided signals are also available internally. The PAL generates the dither signals 5L and 5C in response to the 2 LSBs and the divided clock signals as described below.

The dither signal 5Y is coupled to the adder made up of 7a and 7b where it is added to the blanked and truncated signal from latch 6. Similarly, the chroma dither signal 5C is coupled to PROM 3. Because the chroma signal is clocked at a slower rate, the PROM also serves as an adder, in addition to blanking the chroma signal in response to the chroma blanking signals BL3 and BL4. The blanking action of the Chroma PROM is similar to that of the Luma PROM, however the blanked value is mid scale. The PAL 3 also receives the two LSBs of the chroma signal and provides the chroma dither signal 5C in response to the chroma signal LSBs and the sampling clock. Because of the lower speed of the chroma signal, the PROM 2C is capable of adding the chroma dither signal to the truncated chroma signal, thus outputting a blanked and dithered chroma signal.

The following TABLE 1 is a program listing of the LUMA PROM 2L, the TABLE 2 is a program listing of the CHROMA PROM 2C, and the TABLE 3 is a listing of the PAL 3 program. One skilled in the art will recognize and be able to use this listing to copy and program the PROMS 2Y and 2C and PAL 3 for their own use.

TABLE 1

| ADDRESS | LUMA PROM DATA | | | | | | | | | | | | | | | |
|---|---|---|---|---|---|---|---|---|---|---|---|---|---|---|---|---|
| 000 | 00 | 01 | 02 | 03 | 04 | 05 | 06 | 07 | 08 | 09 | 0A | 0B | 0C | 0D | 0E | 0F |
| 010 | 10 | 11 | 12 | 13 | 14 | 15 | 16 | 17 | 18 | 19 | 1A | 1B | 1C | 1D | 1E | 1F |
| 020 | 20 | 21 | 22 | 23 | 24 | 25 | 26 | 27 | 28 | 29 | 2A | 2B | 2C | 2D | 2E | 2F |
| 030 | 30 | 31 | 32 | 33 | 34 | 35 | 36 | 37 | 38 | 39 | 3A | 3B | 3C | 3D | 3E | 3F |
| 040 | 40 | 41 | 42 | 43 | 44 | 45 | 46 | 47 | 48 | 49 | 4A | 4B | 4C | 4D | 4E | 4F |
| 050 | 50 | 51 | 52 | 53 | 54 | 55 | 56 | 57 | 58 | 59 | 5A | 5B | 5C | 5D | 5E | 5F |
| 060 | 60 | 61 | 62 | 63 | 64 | 65 | 66 | 67 | 68 | 69 | 6A | 6B | 6C | 6D | 6E | 6F |
| 070 | 70 | 71 | 72 | 73 | 74 | 75 | 76 | 77 | 78 | 79 | 7A | 7B | 7C | 7D | 7E | 7F |
| 080 | 80 | 81 | 82 | 83 | 84 | 85 | 86 | 87 | 88 | 89 | 8A | 8B | 8C | 8D | 8E | 8F |
| 090 | 90 | 91 | 92 | 93 | 94 | 95 | 96 | 97 | 98 | 99 | 9A | 9B | 9C | 9D | 9E | 9F |
| 0A0 | A0 | A1 | A2 | A3 | A4 | A5 | A6 | A7 | A8 | A9 | AA | AB | AC | AD | AE | AF |
| 0B0 | B0 | B1 | B2 | B3 | B4 | B5 | B6 | B7 | B8 | B9 | BA | BB | BC | BD | BE | BF |
| 0C0 | C0 | C1 | C2 | C3 | C4 | C5 | C6 | C7 | C8 | C9 | CA | CB | CC | CD | CE | CF |
| 0D0 | D0 | D1 | D2 | D3 | D4 | D5 | D6 | D7 | D8 | D9 | DA | DB | DC | DD | DE | DF |
| 0E0 | E0 | E1 | E2 | E3 | E4 | E5 | E6 | E7 | E8 | E9 | EA | EB | EC | ED | EE | EF |
| 0F0 | F0 | F1 | F2 | F3 | F4 | F5 | F6 | F7 | F8 | F9 | FA | FB | FC | FD | FE | FF |
| 100 | 00 | 00 | 01 | 01 | 02 | 02 | 03 | 03 | 04 | 04 | 05 | 05 | 06 | 06 | 07 | 07 |
| 110 | 08 | 08 | 09 | 09 | 0A | 0A | 0B | 0B | 0C | 0C | 0D | 0D | 0E | 0E | 0F | 0F |
| 120 | 10 | 10 | 11 | 11 | 12 | 12 | 13 | 13 | 14 | 14 | 15 | 15 | 16 | 16 | 17 | 17 |
| 130 | 18 | 18 | 19 | 19 | 1A | 1A | 1B | 1B | 1C | 1C | 1D | 1D | 1E | 1E | 1F | 1F |
| 140 | 20 | 20 | 21 | 21 | 22 | 22 | 23 | 23 | 24 | 24 | 25 | 25 | 26 | 26 | 27 | 27 |
| 150 | 28 | 28 | 29 | 29 | 2A | 2A | 2B | 2B | 2C | 2C | 2D | 2D | 2E | 2E | 2F | 2F |
| 160 | 30 | 30 | 31 | 31 | 32 | 32 | 33 | 33 | 34 | 34 | 35 | 35 | 36 | 36 | 37 | 37 |
| 170 | 38 | 38 | 39 | 39 | 3A | 3A | 3B | 3B | 3C | 3C | 3D | 3D | 3E | 3E | 3F | 3F |
| 180 | 40 | 40 | 41 | 41 | 42 | 42 | 43 | 43 | 44 | 44 | 45 | 45 | 46 | 46 | 47 | 47 |

TABLE 1-continued

LUMA PROM

| ADDRESS | | | | | | | DATA | | | | | | | | | |
|---|---|---|---|---|---|---|---|---|---|---|---|---|---|---|---|---|
| 190 | 48 | 48 | 49 | 49 | 4A | 4A | 4B | 4B | 4C | 4C | 4D | 4D | 4E | 4E | 4F | 4F |
| 1A0 | 50 | 50 | 51 | 51 | 52 | 52 | 53 | 53 | 54 | 54 | 55 | 55 | 56 | 56 | 57 | 57 |
| 1B0 | 58 | 58 | 59 | 59 | 5A | 5A | 5B | 5B | 5C | 5C | 5D | 5D | 5E | 5E | 5F | 5F |
| 1C0 | 60 | 60 | 61 | 61 | 62 | 62 | 63 | 63 | 64 | 64 | 65 | 65 | 66 | 66 | 67 | 67 |
| 1D0 | 68 | 68 | 69 | 69 | 6A | 6A | 6B | 6B | 6C | 6C | 6D | 6D | 6E | 6E | 6F | 6F |
| 1E0 | 70 | 70 | 71 | 71 | 72 | 72 | 73 | 73 | 74 | 74 | 75 | 75 | 76 | 76 | 77 | 77 |
| 1F0 | 78 | 78 | 79 | 79 | 7A | 7A | 7B | 7B | 7C | 7C | 7D | 7D | 7E | 7E | 7F | 7F |
| 200 | 00 | 00 | 00 | 00 | 01 | 01 | 01 | 01 | 02 | 02 | 02 | 02 | 03 | 03 | 03 | 03 |
| 210 | 04 | 04 | 04 | 04 | 05 | 05 | 05 | 05 | 06 | 06 | 06 | 06 | 07 | 07 | 07 | 07 |
| 220 | 08 | 08 | 08 | 08 | 09 | 09 | 09 | 09 | 0A | 0A | 0A | 0A | 0B | 0B | 0B | 0B |
| 230 | 0C | 0C | 0C | 0C | 0D | 0D | 0D | 0D | 0E | 0E | 0E | 0E | 0F | 0F | 0F | 0F |
| 240 | 10 | 10 | 10 | 10 | 11 | 11 | 11 | 11 | 12 | 12 | 12 | 12 | 13 | 13 | 13 | 13 |
| 250 | 14 | 14 | 14 | 14 | 15 | 15 | 15 | 15 | 16 | 16 | 16 | 16 | 17 | 17 | 17 | 17 |
| 260 | 18 | 18 | 18 | 18 | 19 | 19 | 19 | 19 | 1A | 1A | 1A | 1A | 1B | 1B | 1B | 1B |
| 270 | 1C | 1C | 1C | 1C | 1D | 1D | 1D | 1D | 1E | 1E | 1E | 1E | 1F | 1F | 1F | 1F |
| 280 | 20 | 20 | 20 | 20 | 21 | 21 | 21 | 21 | 22 | 22 | 22 | 22 | 23 | 23 | 23 | 23 |
| 290 | 24 | 24 | 24 | 24 | 25 | 25 | 25 | 25 | 26 | 26 | 26 | 26 | 27 | 27 | 27 | 27 |
| 2A0 | 28 | 28 | 28 | 28 | 29 | 29 | 29 | 29 | 2A | 2A | 2A | 2A | 2B | 2B | 2B | 2B |
| 2B0 | 2C | 2C | 2C | 2C | 2D | 2D | 2D | 2D | 2E | 2E | 2E | 2E | 2F | 2F | 2F | 2F |
| 2C0 | 30 | 30 | 30 | 30 | 31 | 31 | 31 | 31 | 32 | 32 | 32 | 32 | 33 | 33 | 33 | 33 |
| 2D0 | 34 | 34 | 34 | 34 | 35 | 35 | 35 | 35 | 36 | 36 | 36 | 36 | 37 | 37 | 37 | 37 |
| 2E0 | 38 | 38 | 38 | 38 | 39 | 39 | 39 | 39 | 3A | 3A | 3A | 3A | 3B | 3B | 3B | 3B |
| 2F0 | 3C | 3C | 3C | 3C | 3D | 3D | 3D | 3D | 3E | 3E | 3E | 3E | 3F | 3F | 3F | 3F |
| 310 | 00 | 00 | 00 | 00 | 00 | 00 | 00 | 00 | 00 | 00 | 00 | 00 | 00 | 00 | 00 | 00 |
| 320 | 00 | 00 | 00 | 00 | 00 | 00 | 00 | 00 | 00 | 00 | 00 | 00 | 00 | 00 | 00 | 00 |
| 330 | 00 | 00 | 00 | 00 | 00 | 00 | 00 | 00 | 00 | 00 | 00 | 00 | 00 | 00 | 00 | 00 |
| 340 | 00 | 00 | 00 | 00 | 00 | 00 | 00 | 00 | 00 | 00 | 00 | 00 | 00 | 00 | 00 | 00 |
| 350 | 00 | 00 | 00 | 00 | 00 | 00 | 00 | 00 | 00 | 00 | 00 | 00 | 00 | 00 | 00 | 00 |
| 360 | 00 | 00 | 00 | 00 | 00 | 00 | 00 | 00 | 00 | 00 | 00 | 00 | 00 | 00 | 00 | 00 |
| 370 | 00 | 00 | 00 | 00 | 00 | 00 | 00 | 00 | 00 | 00 | 00 | 00 | 00 | 00 | 00 | 00 |
| 380 | 00 | 00 | 00 | 00 | 00 | 00 | 00 | 00 | 00 | 00 | 00 | 00 | 00 | 00 | 00 | 00 |
| 390 | 00 | 00 | 00 | 00 | 00 | 00 | 00 | 00 | 00 | 00 | 00 | 00 | 00 | 00 | 00 | 00 |
| 3A0 | 00 | 00 | 00 | 00 | 00 | 00 | 00 | 00 | 00 | 00 | 00 | 00 | 00 | 00 | 00 | 00 |
| 3B0 | 00 | 00 | 00 | 00 | 00 | 00 | 00 | 00 | 00 | 00 | 00 | 00 | 00 | 00 | 00 | 00 |
| 3C0 | 00 | 00 | 00 | 00 | 00 | 00 | 00 | 00 | 00 | 00 | 00 | 00 | 00 | 00 | 00 | 00 |
| 3D0 | 00 | 00 | 00 | 00 | 00 | 00 | 00 | 00 | 00 | 00 | 00 | 00 | 00 | 00 | 00 | 00 |
| 3E0 | 00 | 00 | 00 | 00 | 00 | 00 | 00 | 00 | 00 | 00 | 00 | 00 | 00 | 00 | 00 | 00 |
| 3F0 | 00 | 00 | 00 | 00 | 00 | 00 | 00 | 00 | 00 | 00 | 00 | 00 | 00 | 00 | 00 | 00 |

TABLE 2

CHROMA PROM

| 000 | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 010 | 10 | 11 | 12 | 13 | 14 | 15 | 16 | 17 | 18 | 19 | 1A | 1B | 1C | 1D | 1E | 1F |
| 020 | 20 | 21 | 22 | 23 | 24 | 25 | 26 | 27 | 28 | 29 | 2A | 2B | 2C | 2D | 2E | 2F |
| 030 | 30 | 31 | 32 | 33 | 34 | 35 | 36 | 37 | 38 | 39 | 3A | 3B | 3C | 3D | 3E | 3F |
| 040 | 40 | 41 | 42 | 43 | 44 | 45 | 46 | 47 | 48 | 49 | 4A | 4B | 4C | 4D | 4E | 4F |
| 050 | 50 | 51 | 52 | 53 | 54 | 55 | 56 | 57 | 58 | 59 | 5A | 5B | 5C | 5D | 5E | 5F |
| 060 | 60 | 61 | 62 | 63 | 64 | 65 | 66 | 67 | 68 | 69 | 6A | 6B | 6C | 6D | 6E | 6F |
| 070 | 70 | 71 | 72 | 73 | 74 | 75 | 76 | 77 | 78 | 79 | 7A | 7B | 7C | 7D | 7E | 7F |
| 080 | 80 | 81 | 82 | 83 | 84 | 85 | 86 | 87 | 88 | 89 | 8A | 8B | 8C | 8D | 8E | 8F |
| 090 | 90 | 91 | 92 | 93 | 94 | 95 | 96 | 97 | 98 | 99 | 9A | 9B | 9C | 9D | 9E | 9F |
| 0A0 | A0 | A1 | A2 | A3 | A4 | A5 | A6 | A7 | A8 | A9 | AA | AB | AC | AD | AE | AF |
| 0B0 | B0 | B1 | B2 | B3 | B4 | B5 | B6 | B7 | B8 | B9 | BA | BB | BC | BD | BE | BF |
| 0C0 | C0 | C1 | C2 | C3 | C4 | C5 | C6 | C7 | C8 | C9 | CA | CB | CC | CD | CE | CF |
| 0D0 | D0 | D1 | D2 | D3 | D4 | D5 | D6 | D7 | D8 | D9 | DA | DB | DC | DD | DE | DF |
| 0E0 | E0 | E1 | E2 | E3 | E4 | E5 | E6 | E7 | E8 | E9 | EA | EB | EC | ED | EE | EF |
| 0F0 | F0 | F1 | F2 | F3 | F4 | F5 | F6 | F7 | F8 | F9 | FA | FB | FC | FD | FE | FF |
| 100 | 40 | 40 | 41 | 41 | 42 | 42 | 43 | 43 | 44 | 44 | 45 | 45 | 46 | 46 | 47 | 47 |
| 110 | 48 | 48 | 49 | 49 | 4A | 4A | 4B | 4B | 4C | 4C | 4D | 4D | 4E | 4E | 4F | 4F |
| 120 | 50 | 50 | 51 | 51 | 52 | 52 | 53 | 53 | 54 | 54 | 55 | 55 | 56 | 56 | 57 | 57 |
| 130 | 58 | 58 | 59 | 59 | 5A | 5A | 5B | 5B | 5C | 5C | 5D | 5D | 5E | 5E | 5F | 5F |
| 140 | 60 | 60 | 61 | 61 | 62 | 62 | 63 | 63 | 64 | 64 | 65 | 65 | 66 | 66 | 67 | 67 |
| 150 | 68 | 68 | 69 | 69 | 6A | 6A | 6B | 6B | 6C | 6C | 6D | 6D | 6E | 6E | 6F | 6F |
| 160 | 70 | 70 | 71 | 71 | 72 | 72 | 73 | 73 | 74 | 74 | 75 | 75 | 76 | 76 | 77 | 77 |
| 170 | 78 | 78 | 79 | 79 | 7A | 7A | 7B | 7B | 7C | 7C | 7D | 7D | 7E | 7E | 7F | 7F |
| 180 | 80 | 80 | 81 | 81 | 82 | 82 | 83 | 83 | 84 | 84 | 85 | 85 | 86 | 86 | 87 | 87 |
| 190 | 88 | 88 | 89 | 89 | 8A | 8A | 8B | 8B | 8C | 8C | 8D | 8D | 8E | 8E | 8F | 8F |
| 1A0 | 90 | 90 | 91 | 91 | 92 | 92 | 93 | 93 | 94 | 94 | 95 | 95 | 96 | 96 | 97 | 97 |
| 1B0 | 98 | 98 | 99 | 99 | 9A | 9A | 9B | 9B | 9C | 9C | 9D | 9D | 9E | 9E | 9F | 9F |
| 1C0 | A0 | A0 | A1 | A1 | A2 | A2 | A3 | A3 | A4 | A4 | A5 | A5 | A6 | A6 | A7 | A7 |
| 1D0 | A8 | A8 | A9 | A9 | AA | AA | AB | AB | AC | AC | AD | AD | AE | AE | AF | AF |
| 1E0 | B0 | B0 | B1 | B1 | B2 | B2 | B3 | B3 | B4 | B4 | B5 | B5 | B6 | B6 | B7 | B7 |
| 1F0 | B8 | B8 | B9 | B9 | BA | BA | BB | BB | BC | BC | BD | BD | BE | BE | BF | BF |
| 200 | 60 | 60 | 60 | 60 | 61 | 61 | 61 | 61 | 62 | 62 | 62 | 62 | 63 | 63 | 63 | 63 |
| 210 | 64 | 64 | 64 | 64 | 65 | 65 | 65 | 65 | 66 | 66 | 66 | 66 | 67 | 67 | 67 | 67 |
| 220 | 68 | 68 | 68 | 68 | 69 | 69 | 69 | 69 | 6A | 6A | 6A | 6A | 6B | 6B | 6B | 6B |
| 230 | 6C | 6C | 6C | 6C | 6D | 6D | 6D | 6D | 6E | 6E | 6E | 6E | 6F | 6F | 6F | 6F |

TABLE 2-continued

CHROMA PROM

| | | | | | | | | | | | | | | | | |
|---|---|---|---|---|---|---|---|---|---|---|---|---|---|---|---|---|
| 240 | 70 | 70 | 70 | 70 | 71 | 71 | 71 | 71 | 72 | 72 | 72 | 72 | 73 | 73 | 73 | 73 |
| 250 | 74 | 74 | 74 | 74 | 75 | 75 | 75 | 75 | 76 | 76 | 76 | 76 | 77 | 77 | 77 | 77 |
| 260 | 78 | 78 | 78 | 78 | 79 | 79 | 79 | 79 | 7A | 7A | 7A | 7A | 7B | 7B | 7B | 7B |
| 270 | 7C | 7C | 7C | 7C | 7D | 7D | 7D | 7D | 7E | 7E | 7E | 7E | 7F | 7F | 7F | 7F |
| 280 | 80 | 80 | 80 | 80 | 81 | 81 | 81 | 81 | 82 | 82 | 82 | 82 | 83 | 83 | 83 | 83 |
| 290 | 84 | 84 | 84 | 84 | 85 | 85 | 85 | 85 | 86 | 86 | 86 | 86 | 87 | 87 | 87 | 87 |
| 2A0 | 88 | 88 | 88 | 88 | 89 | 89 | 89 | 89 | 8A | 8A | 8A | 8A | 8B | 8B | 8B | 8B |
| 2B0 | 8C | 8C | 8C | 8C | 8D | 8D | 8D | 8D | 8E | 8E | 8E | 8E | 8F | 8F | 8F | 8F |
| 2C0 | 90 | 90 | 90 | 90 | 91 | 91 | 91 | 91 | 92 | 92 | 92 | 92 | 93 | 93 | 93 | 93 |
| 2D0 | 94 | 94 | 94 | 94 | 95 | 95 | 95 | 95 | 96 | 96 | 96 | 96 | 97 | 97 | 97 | 97 |
| 2E0 | 98 | 98 | 98 | 98 | 99 | 99 | 99 | 99 | 9A | 9A | 9A | 9A | 9B | 9B | 9B | 9B |
| 2F0 | 9C | 9C | 9C | 9C | 9D | 9D | 9D | 9D | 9E | 9E | 9E | 9E | 9F | 9F | 9F | 9F |
| 310 | 80 | 80 | 80 | 80 | 80 | 80 | 80 | 80 | 80 | 80 | 80 | 80 | 80 | 80 | 80 | 80 |
| 320 | 80 | 80 | 80 | 80 | 80 | 80 | 80 | 80 | 80 | 80 | 80 | 80 | 80 | 80 | 80 | 80 |
| 330 | 80 | 80 | 80 | 80 | 80 | 80 | 80 | 80 | 80 | 80 | 80 | 80 | 80 | 80 | 80 | 80 |
| 340 | 80 | 80 | 80 | 80 | 80 | 80 | 80 | 80 | 80 | 80 | 80 | 80 | 80 | 80 | 80 | 80 |
| 350 | 80 | 80 | 80 | 80 | 80 | 80 | 80 | 80 | 80 | 80 | 80 | 80 | 80 | 80 | 80 | 80 |
| 360 | 80 | 80 | 80 | 80 | 80 | 80 | 80 | 80 | 80 | 80 | 80 | 80 | 80 | 80 | 80 | 80 |
| 370 | 80 | 80 | 80 | 80 | 80 | 80 | 80 | 80 | 80 | 80 | 80 | 80 | 80 | 80 | 80 | 80 |
| 380 | 80 | 80 | 80 | 80 | 80 | 80 | 80 | 80 | 80 | 80 | 80 | 80 | 80 | 80 | 80 | 80 |
| 390 | 80 | 80 | 80 | 80 | 80 | 80 | 80 | 80 | 80 | 80 | 80 | 80 | 80 | 80 | 80 | 80 |
| 3A0 | 80 | 80 | 80 | 80 | 80 | 80 | 80 | 80 | 80 | 80 | 80 | 80 | 80 | 80 | 80 | 80 |
| 3B0 | 80 | 80 | 80 | 80 | 80 | 80 | 80 | 80 | 80 | 80 | 80 | 80 | 80 | 80 | 80 | 80 |
| 3C0 | 80 | 80 | 80 | 80 | 80 | 80 | 80 | 80 | 80 | 80 | 80 | 80 | 80 | 80 | 80 | 80 |
| 3D0 | 80 | 80 | 80 | 80 | 80 | 80 | 80 | 80 | 80 | 80 | 80 | 80 | 80 | 80 | 80 | 80 |
| 3E0 | 80 | 80 | 80 | 80 | 80 | 80 | 80 | 80 | 80 | 80 | 80 | 80 | 80 | 80 | 80 | 80 |
| 3F0 | 80 | 80 | 80 | 80 | 80 | 80 | 80 | 80 | 80 | 80 | 80 | 80 | 80 | 80 | 80 | 80 |
| 400 | 00 | 00 | 01 | 02 | 03 | 04 | 05 | 06 | 07 | 08 | 09 | 0A | 0B | 0C | 0D | 1E |
| 410 | 0F | 10 | 11 | 12 | 13 | 14 | 15 | 16 | 17 | 18 | 19 | 1A | 1B | 1C | 1D | 2E |
| 420 | 1F | 20 | 21 | 22 | 23 | 24 | 25 | 26 | 27 | 28 | 29 | 2A | 2B | 2C | 2D | 3E |
| 430 | 2F | 30 | 31 | 32 | 33 | 34 | 35 | 36 | 37 | 38 | 39 | 3A | 3B | 3C | 3D | 4E |
| 440 | 3F | 40 | 41 | 42 | 43 | 44 | 45 | 46 | 47 | 48 | 49 | 4A | 4B | 4C | 4D | 5E |
| 450 | 4F | 50 | 51 | 52 | 53 | 54 | 55 | 56 | 57 | 58 | 59 | 5A | 5B | 5C | 5D | 6E |
| 460 | 5F | 60 | 61 | 62 | 63 | 64 | 65 | 66 | 67 | 68 | 69 | 6A | 6B | 6C | 6D | 7E |
| 470 | 6F | 70 | 71 | 72 | 73 | 74 | 75 | 76 | 77 | 78 | 79 | 7A | 7B | 7C | 7D | 7E |
| 480 | 80 | 82 | 83 | 84 | 85 | 86 | 87 | 88 | 89 | 8A | 8B | 8C | 8D | 8E | 8F | 90 |
| 490 | 91 | 92 | 93 | 94 | 95 | 96 | 97 | 98 | 99 | 9A | 9B | 9C | 9D | 9E | 9F | A0 |
| 4A0 | A1 | A2 | A3 | A4 | A5 | A6 | A7 | A8 | A9 | AA | AB | AC | AD | AE | AF | B0 |
| 4B0 | B1 | B2 | B3 | B4 | B5 | B6 | B7 | B8 | B9 | BA | BB | BC | BD | BE | BF | C0 |
| 4C0 | C1 | C2 | C3 | C4 | C5 | C6 | C7 | C8 | C9 | CA | CB | CC | CD | CE | CF | D0 |
| 4D0 | D1 | D2 | D3 | D4 | D5 | D6 | D7 | D8 | D9 | DA | DB | DC | DD | DE | DF | E0 |
| 4E0 | E1 | E2 | E3 | E4 | E5 | E6 | E7 | E8 | E9 | EA | EB | EC | ED | EE | EF | F0 |
| 4F0 | F1 | F2 | F3 | F4 | F5 | F6 | F7 | F8 | F9 | FA | FB | FC | FD | FE | FF | FF |
| 500 | 40 | 40 | 41 | 41 | 42 | 42 | 43 | 43 | 44 | 44 | 45 | 45 | 46 | 46 | 47 | 47 |
| 510 | 48 | 48 | 49 | 49 | 4A | 4A | 4B | 4B | 4C | 4C | 4D | 4D | 4E | 4E | 4F | 4F |
| 520 | 50 | 50 | 51 | 51 | 52 | 52 | 53 | 53 | 54 | 54 | 55 | 55 | 56 | 56 | 57 | 57 |
| 530 | 58 | 58 | 59 | 59 | 5A | 5A | 5B | 5B | 5C | 5C | 5D | 5D | 5E | 5E | 5F | 5F |
| 540 | 60 | 60 | 61 | 61 | 62 | 62 | 63 | 63 | 64 | 64 | 65 | 65 | 66 | 66 | 67 | 67 |
| 550 | 68 | 68 | 69 | 69 | 6A | 6A | 6B | 6B | 6C | 6C | 6D | 6D | 6E | 6E | 6F | 6F |
| 560 | 70 | 70 | 71 | 71 | 72 | 72 | 73 | 73 | 74 | 74 | 75 | 75 | 76 | 76 | 77 | 77 |
| 570 | 78 | 78 | 79 | 79 | 7A | 7A | 7B | 7B | 7C | 7C | 7D | 7D | 7E | 7E | 7F | 7F |
| 580 | 80 | 80 | 81 | 81 | 82 | 82 | 83 | 83 | 84 | 84 | 85 | 85 | 86 | 86 | 87 | 87 |
| 590 | 88 | 88 | 89 | 89 | 8A | 8A | 8B | 8B | 8C | 8C | 8D | 8D | 8E | 8E | 8F | 8F |
| 5A0 | 90 | 90 | 91 | 91 | 92 | 92 | 93 | 93 | 94 | 94 | 95 | 95 | 96 | 96 | 97 | 97 |
| 5B0 | 98 | 98 | 99 | 99 | 9A | 9A | 9B | 9B | 9C | 9C | 9D | 9D | 9E | 9E | 9F | 9F |
| 5C0 | A0 | A0 | A1 | A1 | A2 | A2 | A3 | A3 | A4 | A4 | A5 | A5 | A6 | A6 | A7 | A7 |
| 5D0 | A8 | A8 | A9 | A9 | AA | AA | AB | AB | AC | AC | AD | AD | AE | AE | AF | AF |
| 5E0 | B0 | B0 | B1 | B1 | B2 | B2 | B3 | B3 | B4 | B4 | B5 | B5 | B6 | B6 | B7 | B7 |
| 5F0 | B8 | B8 | B9 | B9 | BA | BA | BB | BB | BC | BC | BD | BD | BE | BE | BF | BF |
| 600 | 60 | 60 | 60 | 60 | 61 | 61 | 61 | 61 | 62 | 62 | 62 | 62 | 63 | 63 | 63 | 63 |
| 610 | 64 | 64 | 64 | 64 | 65 | 65 | 65 | 65 | 66 | 66 | 66 | 66 | 67 | 67 | 67 | 67 |
| 620 | 68 | 68 | 68 | 68 | 69 | 69 | 69 | 69 | 6A | 6A | 6A | 6A | 6B | 6B | 6B | 6B |
| 630 | 6C | 6C | 6C | 6C | 6D | 6D | 6D | 6D | 6E | 6E | 6E | 6E | 6F | 6F | 6F | 6F |
| 640 | 70 | 70 | 70 | 70 | 71 | 71 | 71 | 71 | 72 | 72 | 72 | 72 | 73 | 73 | 73 | 73 |
| 650 | 74 | 74 | 74 | 74 | 75 | 75 | 75 | 75 | 76 | 76 | 76 | 76 | 77 | 77 | 77 | 77 |
| 660 | 78 | 78 | 78 | 78 | 79 | 79 | 79 | 79 | 7A | 7A | 7A | 7A | 7B | 7B | 7B | 7B |
| 670 | 7C | 7C | 7C | 7C | 7D | 7D | 7D | 7D | 7E | 7E | 7E | 7E | 7F | 7F | 7F | 7F |
| 680 | 80 | 80 | 80 | 80 | 81 | 81 | 81 | 81 | 82 | 82 | 82 | 82 | 83 | 83 | 83 | 83 |
| 690 | 84 | 84 | 84 | 84 | 85 | 85 | 85 | 85 | 86 | 86 | 86 | 86 | 87 | 87 | 87 | 87 |
| 6A0 | 88 | 88 | 88 | 88 | 89 | 89 | 89 | 89 | 8A | 8A | 8A | 8A | 8B | 8B | 8B | 8B |
| 6B0 | 8C | 8C | 8C | 8C | 8D | 8D | 8D | 8D | 8E | 8E | 8E | 8E | 8F | 8F | 8F | 8F |
| 6C0 | 90 | 90 | 90 | 90 | 91 | 91 | 91 | 91 | 92 | 92 | 92 | 92 | 93 | 93 | 93 | 93 |
| 6D0 | 94 | 94 | 94 | 94 | 95 | 95 | 95 | 95 | 96 | 96 | 96 | 96 | 97 | 97 | 97 | 97 |
| 6E0 | 98 | 98 | 98 | 98 | 99 | 99 | 99 | 99 | 9A | 9A | 9A | 9A | 9B | 9B | 9B | 9B |
| 6F0 | 9C | 9C | 9C | 9C | 9D | 9D | 9D | 9D | 9E | 9E | 9E | 9E | 9F | 9F | 9F | 9F |
| 710 | 80 | 80 | 80 | 80 | 80 | 80 | 80 | 80 | 80 | 80 | 80 | 80 | 80 | 80 | 80 | 80 |
| 720 | 80 | 80 | 80 | 80 | 80 | 80 | 80 | 80 | 80 | 80 | 80 | 80 | 80 | 80 | 80 | 80 |
| 730 | 80 | 80 | 80 | 80 | 80 | 80 | 80 | 80 | 80 | 80 | 80 | 80 | 80 | 80 | 80 | 80 |
| 740 | 80 | 80 | 80 | 80 | 80 | 80 | 80 | 80 | 80 | 80 | 80 | 80 | 80 | 80 | 80 | 80 |
| 750 | 80 | 80 | 80 | 80 | 80 | 80 | 80 | 80 | 80 | 80 | 80 | 80 | 80 | 80 | 80 | 80 |
| 760 | 80 | 80 | 80 | 80 | 80 | 80 | 80 | 80 | 80 | 80 | 80 | 80 | 80 | 80 | 80 | 80 |

TABLE 2-continued

| | | | | | | | CHROMA PROM | | | | | | | | | |
|---|---|---|---|---|---|---|---|---|---|---|---|---|---|---|---|---|
| 770 | 80 | 80 | 80 | 80 | 80 | 80 | 80 | 80 | 80 | 80 | 80 | 80 | 80 | 80 | 80 | 80 |
| 780 | 80 | 80 | 80 | 80 | 80 | 80 | 80 | 80 | 80 | 80 | 80 | 80 | 80 | 80 | 80 | 80 |
| 790 | 80 | 80 | 80 | 80 | 80 | 80 | 80 | 80 | 80 | 80 | 80 | 80 | 80 | 80 | 80 | 80 |
| 7A0 | 80 | 80 | 80 | 80 | 80 | 80 | 80 | 80 | 80 | 80 | 80 | 80 | 80 | 80 | 80 | 80 |
| 7H0 | 80 | 80 | 80 | 80 | 80 | 80 | 80 | 80 | 80 | 80 | 80 | 80 | 80 | 80 | 80 | 80 |
| 7C0 | 80 | 80 | 80 | 80 | 80 | 80 | 80 | 80 | 80 | 80 | 80 | 80 | 80 | 80 | 80 | 80 |
| 7D0 | 80 | 80 | 80 | 80 | 80 | 80 | 80 | 80 | 80 | 80 | 80 | 80 | 80 | 80 | 80 | 80 |
| 7E0 | 80 | 80 | 80 | 80 | 80 | 80 | 80 | 80 | 80 | 80 | 80 | 80 | 80 | 80 | 80 | 80 |
| 7F0 | 80 | 80 | 80 | 80 | 80 | 80 | 80 | 80 | 80 | 80 | 80 | 80 | 80 | 80 | 80 | 80 |

TABLE 3

```
Module pla_dthr05
flag '-r3'
title 'dither05'                      SPG burst smpl
VATEK UNITY project                   03-8-90 V LOWE
_dthr05 device 'p16v8r';
" 01 V. Lowe creation - 04-26-91
" 02 add 1.5 clk
" 03 add control bit
" 04 make output combinatorial
" 05 mod CADD equation
"*NOTE* This device is used to add dither to the blanking
" PAL to minimize the effects of rounding. The blanking PAL
" adds 1 to the input value when YADD is high instead of only
" dithering by changing state of the LSB. Note that YADD is
" dithered at ½ clock rate when the 9th LSB is high and the
" 10th LSB is low. YADD is high ¾th of the time when both are
" high (11) and high ¼th of the time when the 9th LSB is low and
" the 10th is high (01). CADD is the chroma dither control and is
" dithered at ½ the luma rate because the chroma is sampled at ½
" the luma rate in the system.
"OUTPUTS
SPO      PIN 19 ='pos,reg';    " SPARE
CADD     PIN 18 ='pos,com';    " C ADD LSB
YADD     PIN 17 ='pos,com';    " Y ADD LSB
SP1      PIN 16 ='pos,reg';    " SPARE
CK3      PIN 15 ='pos,reg';    " CLOCK DIVIDED BY 4
                                 (3.375 MHz)
HSQ      PIN 14 ='pos,reg';    " H SQUARE WAVE
CK6      PIN 13 ='pos,reg';    " CLOCK DIVIDED BY 2
                                 (6.75 MHz)
CK1_5    PIN 12 ='pos,reg';    " CLOCK DIVIDED BY 8
                                 (1.6875 MHz)
"INPUTS
CK       PIN 1;                " 13.5 MHZ INPUT CLOCK
YX       PIN 2;                " Y LSB -1
YY       PIN 3;                " Y LSB -2
CX       PIN 4;                " C LSB -1
CY       PIN 5;                " C LSB -2
HRST     PIN 6;                " H RESET FROM
                                 COUNTER
CONTROL  PIN 7;                " EXTERNAL DITHER
                                 ON CONTROL. HIGH =
                                 DITHER ON
S1       PIN 8;                " SPARE INPUTS
S2       PIN 9;                   "
S3       PIN 10;                  "
S4       PIN 11;                  "
"CONSTANTS
c = .c.;
x = .x.;
z = .z.;
equations
HSQ := (!HSQ 7 !HRST_) # (HSQ 7 HRST_);
CK6 := (!CK6);
CK3 := (!CK3 & CK6) # (CK3 & !CK6);
CK1_5 := (CK6 & CK3 & !CK1_5) # (CK1_5 & !(CK6 & CK3));
YADD = (YX & !YY & CK6 & HSQ) & CONTROL
     # (YX & !YY & !CK6 & !HSQ) & CONTROL
     # (YX & YY & (CK6 # CK3)) & CONTROL
     # (!YX & YY & CK6 & CK3) & CONTROL;
CADD = (CX & CK3 & CONTROL)
     # (CX & CY & (CK3 # CK1_5)) & CONTROL
     # (!CX & CY & CK3 & CK1_5) & CONTROL
end;
```

The following is a description of the technique applied to a digital video signal using CCIR-601 quantizing and clock rates but the invention is not limited to this digital format. The 9th bit is encoded, in this scheme, by adding one to the upper 8 bits on alternate clocks of the sampling clock, 13.5 MHz in the present example, making the encoded data frequency 6.75 MHz which is ½ of 13.5 MHz. The addition is alternated on alternate signal periods, in the present example horizontal lines, by using to the opposite phase of the 6.75 MHz clock. This means that there are is period to period coherent dither. In video there are no vertical stripes visible because the brighter pixels on one line are offset from the lines above and below. The line alternation also causes a natural frame to frame interleaving of the pixels that are brightened. Interlaced 525 and 625 line video has an odd number of lines per frame so that the first line of one frame is an odd number of inversions from the line in the previous frame. Therefore, the phase of encoding, on any particular line, is inverted from one frame to the next.

The 10th bit is encoded by using a clock derived by dividing the sample clock by four. The phase is also reversed in alternate periods. This division produces a natural phase alternation from line to line in 525 line video with a 13.5 MHz clock. 858 divided by $4 = 214.5$. The ½ cycle remainder causes a line alternation. In 625 video systems 864 samples are created because of the slightly longer line length. This means that the ¼ clock rate divides evenly so the encoding clock must be forced to alternate to achieve the desired concealment effect.

If an 11th bit were to be decoded, it would be encoded at the sample clock divided by 8, and a 12th bit would be encoded at the sample clock divided by 16, etc. Alternatively, but less preferred, encoding at rates other than binary can be used, for example, the sample clock ÷ 2, 3, 4, and 5 for the 9th, 10th, 11th, and 12th bits respectively. This method is less preferred however because of added complexity in deriving the clock and in ensuring the proper period to period phase reversal.

The binary encoding method is described in the following table. A 1 indicates that 1 is to be added to the upper 8 bits on that pixel and a 0 indicates that nothing is added.

| | bits 9 10 | repeating addition factor across the line | |
|---|---|---|---|
| | | odd field time→ | even field time→ |
| line odd | 0 1 | 010001000100 | 000100010001 |
| line even | 0 1 | 000100010001 | 010001000100 |
| line odd | 1 0 | 010101010101 | 101010101010 |
| line even | 1 0 | 101010101010 | 010101010101 |
| line odd | 1 1 | 011101110111 | 110111011101 |
| line even | 1 1 | 110111011101 | 011101110111 |

Three factors work together to make this encoding method appear invisible for video:

1. The lowpass filter prescribed for the D1 digital standard is 6 db down at 6.75 MHz.
2. The fine pitch of the encoding is too small for the eye to resolve at normal viewing distances.
3. The eye integrates the 30 Hertz frame rate in the low level intensity changes in the same pixel location to make the encoding appear invisible.

In systems where it is desired to pass the truncated signal through the invention a plurality of times, the encoding phase is to be reversed where two inventions are cascaded or where multiple generations of production through one invention are required. The encoding phase can be predetermined by the system control computer. When the signal paths include multipliers or otherwise can present a full scale truncated video signal, that is the multiplication coefficient is 1111 1111, or the video is allowed to achieve a value of 1111 1111, a different technique is used to create a lossless pass through the system. When two multipliers are in series and less than full scale output is expected, or the path otherwise is not expected to pass full value video, the invention will both encode the 9th and 10th bits using the above scheme. The second correction stage, or second pass through the encoding is caused to use the odd line encoding for even line encoding to interleave the corrections instead of adding another LSBs at the same point on each line.

Multiple generation dither encoding would possibly degrade the picture if the encoding always affected the same pixels on each line. Therefore, a detections scheme will be incorporated to determine the presence of previous encoding and the dominant phase of that encoding. Once information of the encoding and the dominant phase has been determined, that information will be used to force the new encoding to interleave with previous encoding. The first encoding detection scheme is to place a synchronization code in the horizontal or vertical blanking of the video signal. The second encoding detection scheme is to bury a flag signal at a vertical and/or horizontal rate that defines the last encoding phase. This can be done by forcing a 1 on the LSB of the first active pixel of each line that uses odd encoding and a 0 on the first active pixel of each line using even encoding. When used with video effects systems, this technique properly identifies full field and vertical split wipes but misidentifies the second half of horizontally split wipes. A second technique uses a phase comparison technique to compare the amplitude of each pixel to the preceding pixel to achieve a greater than, less than, or equal to comparison and then comparing to the ½ clock and ¼ clock to determine encoding phase. This technique will only be effective part of the time but will give accurate phase information on a long term average and may be used solely, or in conjunction with the buried flag to give an indication in the absence of a flag reference.

SUMMARY OF RECOVERY OF ENCODED LSB

The primary purpose of the decoder is to generate additional LSBs in a data path in response to the preinserted dither, so as to convey more bits of information to the eye without creating visible artifacts. Another benefit of using the predetermined encoding algorithm that alternates from line to line and produce 10 bits of resultant data by using horizontal, vertical, field and/or frame rate recovery filters. It should be noted that in many applications, the action of the reconstruction LPF which follows the D-A convertor, or alternatively which follows the resampling section of the system, and which produces the continuous analog output, will provide sufficient recovery filtering action to make it unnecessary to use any additional recovery filtering circuit, and therefore, the invention may be practiced with the encoder circuit alone.

The preferred embodiment of the recovery filter is to combine the LSB from surrounding pixels, with a central pixel. These filtering techniques are most useful when the data is not changing in one of the dimensions from which the pixels are selected, or changing at a very small rate. Adjacent pixels in the H, V, and time dimensions are preferred for the filtering, however diagonally adjacent or other surrounding but not adjacent pixels can also be used, either alone or in conjunction with the adjacent pixels.

Figure 3:
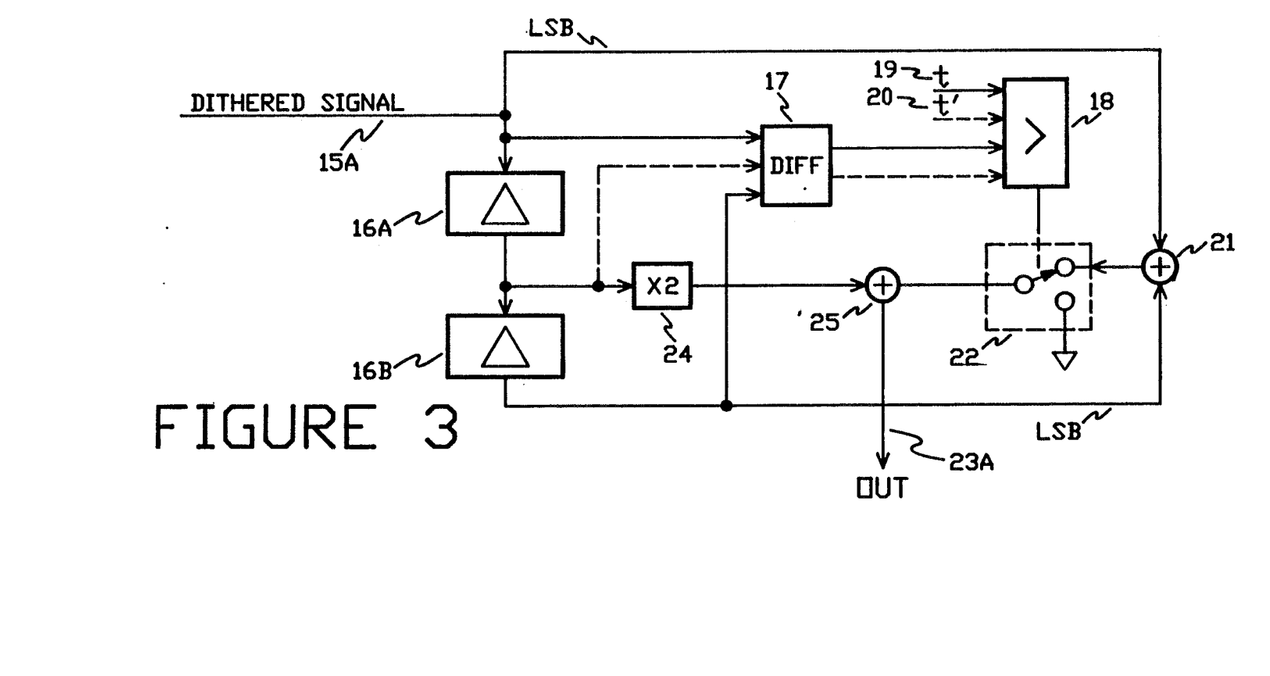
FIG. 3 is a diagram of an embodiment of the decoder means of the invention.

FIG. 3 shows the preferred embodiment of the decoder section of the invention, having dithered signal input 15a, delays 16a and 16b coupled to the input dithered signal to provide a plurality of surrounding elements, including a central element. The range of delay for 16 is preferred to be one or two sample periods, however larger periods may be utilized as well. FIG. 3 further includes difference detector 17 coupled to at least a pair of the plurality of surrounding versions, preferably two outer versions to determine the difference thereof, and comparator 18 responsive to at least one threshold value 19 and alternative to other threshold values 20 and to the difference detector 17 to determine if the difference of the surrounding versions of dithered signal input to the difference detector is greater than a threshold, and adder 21 responsive to some of the LSBs of the outer surrounding versions to provide the sum thereof, switch mechanism 22 responsive to 18 to select the output of 21, or a signal equivalent to zero to be combined with twice the central version in adder 25, thereby creating the higher precision version of said dithered input signal 15a as output signal 23a. For clarity, a scaler 24 is shown which scales the central element by 2X, however in practice, this is preferred be accomplished by simple bit shifting. Shown as an alternate embodiment, the central element may also be coupled to 17, thereby producing two differences, each of which is compared to a corresponding threshold 19 and 20. If both differences are less than the threshold, 22 is caused to select the output of 21.

In the digital video version of the preferred embodiment of FIG. 3, the delays 16a and 16b may range from one to a few sample periods, preferably one, thereby providing a central and two outer surrounding pixels. The outer pixels are preferred to be coupled to the difference detector 17, which computes the difference thereof, and comparator 18 compares said difference to the threshold 19. If the difference is less than the threshold, switch 22 is caused to select the output of 21, and if the difference is greater than the threshold, the switch 22 is caused to select a zero for input to 20. The value output from switch 22 is then added to the central pixel by adder 25 and this sum is output at 23a as the improved resolution version of the dithered input 15a. Essentially, the precision recovery is achieved by adding the two LSBs on either side of the center pixel and adding the result to twice the center pixel. The two additions gives a 10 bit result. That is the sum of the two adjacent LSBs is added to twice the center pixel. This type of recovery works best if limited to picture areas with very little horizontal change.

Vertical recovery may be achieved by the same method, except that the pixels from which the LSBs are taken are adjacent in the V direction. Vertical recovery is preferred to by achieved by adding the two pixels from the lines above and/or below the center pixel and adding the result to twice the center pixel. This would be accomplished by changing delays 16a and 16b each to one horizontal line. Again, the two additions have a 10 bit result. Vertical recovery is preferred to be limited to areas of the picture with very little vertical change by using subtraction and a threshold detector shown by 17 and 18. Similarly, time recovery may utilize pixels in the time dimension, that is from the previous and next field or frame, by changing delays 16a and b to field or frame delays. Similarly it is preferred to be limited to picture areas having very little time change by using a subtraction and a threshold detector.

The type of recovery, that is the direction(s) from which the pixels containing the LSBs which are selected is preferred to be limited to picture areas with very little change. This can be done by subtracting adjacent pixels and using a threshold detector to inhibit the addition of the adjacent pixels, as is commonly done in the art to control noise reduction averaging. Such a system is shown by Stratton in U.S. Pat. No. 4,803,547, in which horizontal and vertical differences are compared and used to switch between horizontal and vertical averaging. While Stratton is used to implement a comb filter for chroma separation, one skilled in the art will be capable of using the teachings of Stratton, in conjunction with the present disclosure, to properly construct a recovery circuit to implement the present invention.

Figure 4:
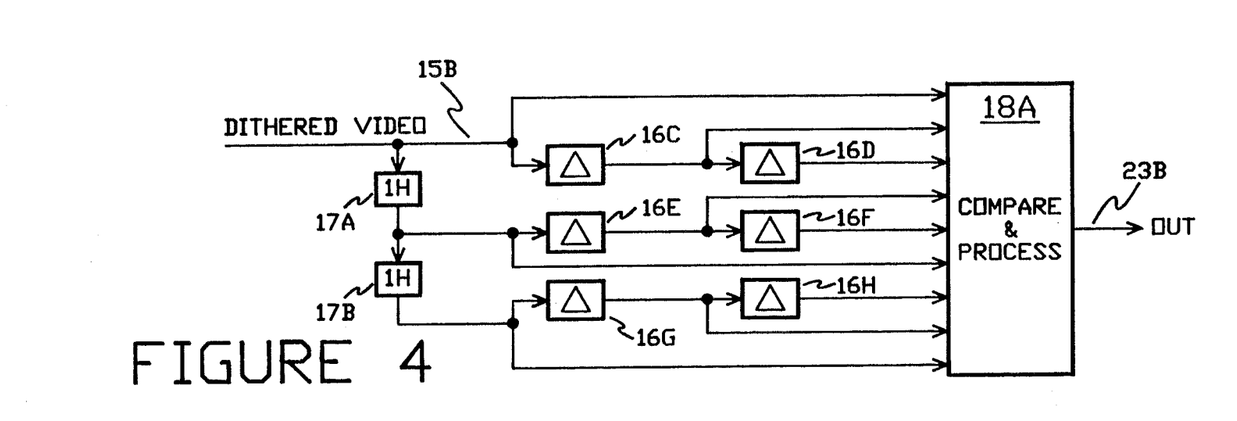
FIG. 4 is a diagram of a second embodiment of the decoder of the invention.

A recovery circuit architecture which utilizes 9 surrounding elements to allow comparison of differences in horizontal, vertical and diagonal directions is shown in FIG. 4. The dithered input at 15b is coupled to comparison and processing circuit 18A, as well as to delays 16c through 16h, and 17a and 17b, in order to provide three elements each of three consecutive scans of the input signal to the comparison and processing circuit. If the delays 16 are one sample clock, and delays 17 are one scan line, the 9 elements will be a central and 8 surrounding elements. The comparison and processing 18a will then compute which direction has the smallest gradient, and process the central element and LSBs of the surrounding elements in that direction to produce the increased precision output 23b.

Figure 5:
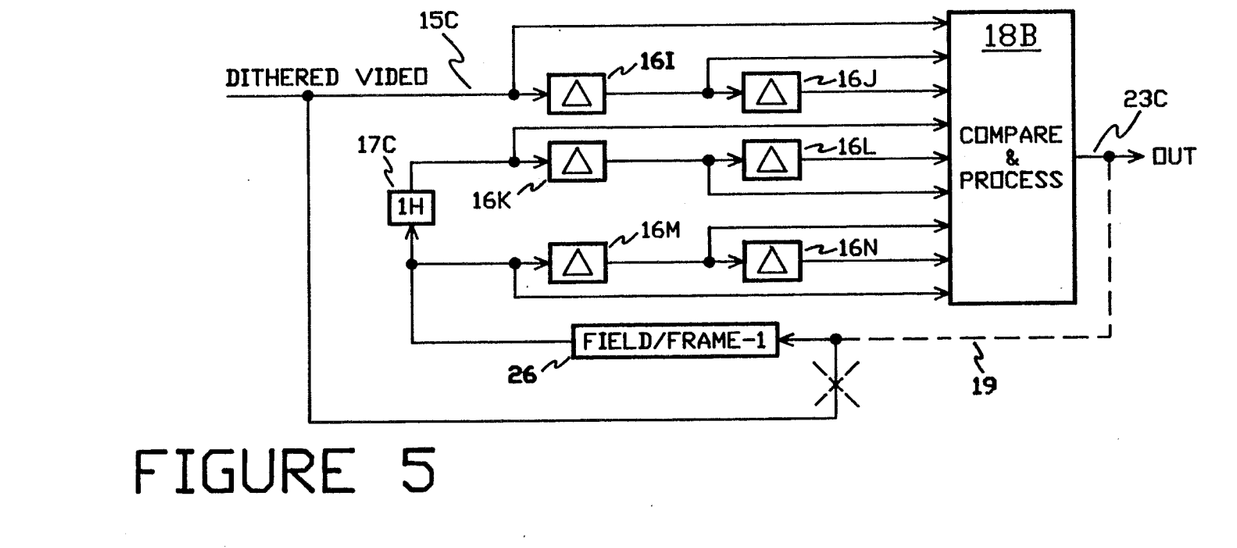
FIG. 5 is a diagram of a third embodiment of the decoder of the invention.

FIG. 5 shows a recovery circuit similar to FIG. 4 which allows the 9 elements to be taken from two frames, or from two fields. The dithered input at 15c is coupled to comparison and processing circuit 18b, as well as to delays 16i through 16n, and field or frame delay 26, and 1H delay 17c, in order to provide three elements each of three scans of the input signal to the comparison and processing circuit. One scan will be the present scan, and the other two from the previous field or frame depending on the length of 26. Note that 26 is offset by 1H as necessary to provide the scan above and scan below the input scan If the delays 16 are one sample clock, and delay 17c is one scan line, the 9 elements will be a central and 8 surrounding elements as with FIG. 4. The comparison and processing 18b will then compute which direction has the smallest gradient, and process the central element and LSBs of the surrounding elements in that direction to produce the increased precision output 23c.

Note in FIG. 5 that the comparison may be made between the input and previously output elements by enabling the delay 26 connection 19 in place of the connection to 15c. This will provide a recursive process capable achieving of even greater precision.

One skilled in the art will further realize that the addition may be selectively performed in either the H, V or time direction, with the selection being determined in response to the gradient or other measure of difference in that direction. The calculation of gradients which may be used to control such selection of addition is well known in the art, for example as discussed by Graham in U.S. Pat. No. 3,009,016. Alternatively, a ranking of the differences could be used to determine the direction of selection of pixels for combination, such as the ranking shown in U.S. Pat. No. 4,573,070.

As previously indicated, any combination of the three types of filtering can be used at any time or all at the same time to give the best decoding result, providing the change in the directions being used at a given instant is relatively small. In other words, it is preferred however that any dimension of filtering have little or no change in that dimension. These adaptive techniques that limit the filtering to small threshold changes in any particular dimension are used to limit any softening artifacts in the picture. These techniques can recover the 9th and 10th bits in the picture areas that need the most gray scale resolution. That is because, in most picture material, 8 bits of resolution are adequate in rapidly changing areas and less resolution only becomes noticeable in flat or slowly changing areas. It is generally preferred that only the last LSB of the dithered signal be used, however is possible to use the last two or last 3, or even the entire surrounding element with sufficient scaling of the central element to which they are added. The use of the last LSB is however quite simple to implement, and the use of additional bits brings about little or no improvement thereon.

The recovery can further be adaptively modified in response to the differences in a plurality of directions, in a fashion such that a portion of the sum of the LSBs in each of the directions is added to a central pixel, with the portion being responsive to the relative difference in magnitude of the differences for each direction. For example, if the differences in the H and V direction are within 20% of equality, then half of the H LSB sum and half of the V LSB sum would be added to the central pixel. If the H direction difference were less than 80% of the V direction sum, then all of the H LSB sum and none of the V LSB sum would be added to the central pixel. Conversely, of the V direction difference were less than 80% of the H direction sum, then all of the V LSB sum and none of the H LSB sum would be added to the central pixel. This operation could be conveniently carried out in a PROM look up table, where the portion of the directional sum to be combined with the central pixel is output in response to the difference of the direction differences, with the outputs then being added to the central pixel. Of course, a multiplicity of curves of output VS input VS difference of direction differences can be implemented in the PROM to suit the particular needs of the system.

As previously noted, the same inventive principals can be applied to any width of data path and reductions to any width of truncated data path. For example, 12 bits can be encoded in a 10 bit data path or an 8 bit data path, 14 bits in a 12 bit path and so forth. Similarly, recovery can be achieved to support any of the various reductions.

What is claimed is:

1. Apparatus for reducing the precision of a quantized electronic signal which has been quantized at a quantizing rate, wherein lower significance portions of said quantized electronic signal are discarded to produce a truncated version thereof, including in combination;
   dither rate generating apparatus responsive to said quantizing rate to generate a dither rate signal,
   dither apparatus responsive to said discarded lower significance portions and said dither rate signal to product a dither signal, and
   combining means to combine said dither signal and said truncated version to provide the reduced precision version of said quantized electronic signal.

2. Apparatus for providing a reduced precision version of a digitally quantized electronic signal which has been quantized at a quantizing clock rate, wherein lower significance bits of said quantized electronic signal are discarded to produce a truncated version thereof, including in combination;
   dither rate generating apparatus responsive to said quantizing clock rate to generate a dither rate signal at a sub multiple of the rate thereof,
   dither apparatus responsive to said discarded lower significance bits and said dither rate signal to product a dither signal, and
   combining means to combine said dither signal and said truncated version to provide said reduced precision version.

3. Apparatus as claimed in claim 1 or 2 wherein said quantized electronic signal is a television video signal.

4. Apparatus as claimed in claim 1 or 2 wherein said quantized electronic signal is a television video signal digitized at said quantizing rate by a sampling clock wherein said dither rate signal is produced by dividing said sampling clock in a divider circuit.

5. Apparatus as claimed in claim 1 or 2 wherein said dither signal takes on a value of zero or the amount of the smallest quantizing amount of said truncated version in response to said discarded portion.

6. Apparatus as claimed in claim 1 or 2 wherein said quantized electronic signal is a television video signal digitized at said quantizing rate by a sampling clock wherein said dither rate signal is produced by dividing said sampling clock in a divider circuit and where the phase of said dither rate signal is alternated from period to period of said television video signal, where said period is one of the line period, field period, or the frame period.

7. Apparatus as claimed in claim 1 or 2 wherein said quantized electronic signal is a television video signal digitized at said quantizing rate by a sampling clock wherein the M Least Significant Bits (LSBs) from a N bit wide signal are discarded to produce a N-M bit wide truncated signal with N and M being integers, and wherein said dither signal takes on a 1 LSB value $X/(2^M)$ of the time where the value of the discarded portion is equal to X.

8. Apparatus as claimed in claim 1 or 2 wherein said quantized electronic signal is a television video signal digitized to 10 bit accuracy at said quantizing rate by a sampling clock wherein the 2 Least Significant Bits (LSBs) from a 10 bit wide signal are discarded to produce an 8 bit wide truncated signal, and
   wherein said dither signal takes on a value of one 25% of the time when the two LSBs are Binary 01, one 50% of the time when the LSBs are Binary 10, and one 75% of the time when the LSBs are Binary 11.

9. Apparatus as claimed in claim 1 or 2 further including recovery means to recover said discarded portions, including in combination,
   delay means to delay said reduced precision version to provide a plurality of elements thereof including first, second and third elements,
   comparison means responsive to said delay means to compare the difference of at least said first and third elements to a threshold to determine the larger thereof,
   processing means responsive to said second element and to the lower significance portions of said first and third elements and to said comparison means, to selectively combine said lower significance portions and said second element in response to said difference comparison.

10. The method of reducing the precision of a quantized electronic signal which has been quantized at a quantizing rate, wherein lower significance portions of said quantized electronic signal are discarded to produce a truncated version thereof, including the steps of;
    generating a dither rate signal in response to said quantizing rate,
    producing a dither signal in response to said discarded lower significance portions and said dither rate signal, and
    combining said dither signal and said truncated version to provide the reduced precision version of said quantized electronic signal.

11. The method as claimed in claim 10 wherein said quantized electronic signal is a television video signal.

12. The method as claimed in claim 10 wherein said quantized electronic signal is a television video signal digitized at said quantizing rate by a sampling clock wherein said dither rate signal is produced by dividing said sampling clock in a divider circuit.

13. The method as claimed in claim 10 wherein said dither signal takes on a value of zero or the amount of the smallest quantizing amount of said truncated version in response to said discarded portion.

14. The method as claimed in claim 10 wherein said quantized electronic signal is a television video signal digitized at said quantizing rate by a sampling clock wherein said step of producing said dither rate signal is performed by dividing said sampling clock in a divider circuit and where the phase of said dither rate signal is alternated from period to period of said television video signal, where said period is one of the line period, field period, or the frame period.

15. The method as claimed in claim 10 wherein said quantized electronic signal is a television video signal digitized at said quantizing rate by a sampling clock wherein the M Least Significant Bits (LSBs) from a N bit wide signal are discarded to produce a N-M bit wide truncated signal with N and M being integers, and
    wherein the step of producing said dither signal operates to provide said dither signal having a 1 LSB value $X/(2^M)$ of the time where the value of the discarded portion is equal to X.

16. The method as claimed in claim 10 wherein said quantized electronic signal is a television video signal digitized to 10 bit accuracy at said quantizing rate by a sampling clock wherein the 2 Least Significant Bits (LSBs) from a 10 bit wide signal are discarded to produce an 8 bit wide truncated signal, and wherein the step of producing said dither signal causes said dither signal to have a value of one 25% of the time when the two LSBs are 01, one 50% of the time when the LSBs are 10, and one 75% of the time when the LSBs are 11 with said dither signal being added to said truncated version in said combining step.

17. The method as claimed in claim 10 further including the recovery of said discarded portions, including the steps of, delaying said reduced precision version to provide a plurality of elements thereof including first, second and third elements, a comparing step responsive to the delay step to compare the difference of at least said first and third elements to a threshold to determine the larger thereof, a processing step responsive to said second element and to the lower significance portions of said first and third elements and to said comparison step, to selectively combine said lower significance portions and said second element in response to said difference comparison.

* * * * *